United States Patent [19]

Penberthy

[11] 4,019,407
[45] Apr. 26, 1977

[54] SAW CHAIN GRINDER FIXTURE

[75] Inventor: Robert J. Penberthy, Gladstone, Oreg.

[73] Assignee: Omark Industries, Inc., Portland, Oreg.

[22] Filed: Oct. 29, 1975

[21] Appl. No.: 626,839

[52] U.S. Cl. .............................. 76/37; 51/170 PT; 51/208; 76/25 A
[51] Int. Cl.² .................. B23D 63/16; B24B 23/02
[58] Field of Search ............... 76/25 A, 36, 37, 74; 51/170 PT, 208, 241 G, 241 S; 33/202

[56] References Cited

UNITED STATES PATENTS

| | | | |
|---|---|---|---|
| 2,770,985 | 11/1956 | Pearce | 76/25 A |
| 3,055,238 | 9/1962 | Hazzard | 76/25 A |
| 3,354,753 | 11/1967 | Kennemore | 76/37 |
| 3,738,200 | 6/1973 | Granberg | 76/25 A |
| 3,905,118 | 9/1975 | Ballew | 76/25 A X |

Primary Examiner—Al Lawrence Smith
Assistant Examiner—Nicholas P. Godici
Attorney, Agent, or Firm—Robert L. Harrington

[57] ABSTRACT

A rod having one end adapted to be secured in the chuck of a power tool, said rod having a grinding portion for sharpening the cutting edge of a saw chain cutting link when rotatively driven by the power tool, and a guide fixture supported on said rod including guide surfaces adapted to rest on the top plate and depth gauge of the cutting link and thereby locate the grinding portion of the rod for proper sharpening of the cutting edge of the saw chain.

7 Claims, 5 Drawing Figures

SAW CHAIN GRINDER FIXTURE

HISTORY OF INVENTION

This invention relates to a saw chain grinder fixture including a rod having a grinding portion rotatively driven by a power tool and including a guide fixture for locating the grinding portion of the rod relative to the cutting edge of a saw chain cutting link.

Many attempts have been made to simplify the process of sharpening the cutting edges of saw chain. Whereas improved chains, improved files and improved guide fixtures, e.g. see the commonly assigned U.S. Pat. No. 3,905,118, have all contributed to simplify hand sharpening, the more recent emphasis is to provide chain saw users with small portable powered grinders. Because most chain saw users are less than expert at sharpening a saw chain and because the performance of the chain is affected greatly by proper sharpening, the grinder must be uncomplicated and essentially foolproof. It is also important that the grinder be easy to handle and inexpensive. An attempt to satisfy these criteria is disclosed in U.S. Pat. No. 3,354,753 issued to P. H. Kennemore. This grinder, however, has several drawbacks. Although the grinding rod is simple and can be adapted for use in the chuck of a common power tool, the guide fixture is also mounted to the tool and special mounting brackets must be provided. This mounting has to be precisely fixed relative to the chuck mounting of the rod in order to develop the necessary relationship between the guide surfaces of the guide fixture and the grinding portion of the rod. Furthermore any play that develops in either the guide fixture mounting or the chuck mounting will prevent proper sharpening.

The present invention is believed to provide all the advantages of the tool described in the Kennemore patent while providing improvements in reliability and reduced expense. In the present invention the guide fixture is mounted directly onto the rod so as to directly fix the relationship between the grinding portion of the rod and the guide surfaces of the guide fixture. Furthermore, the only mounting of the entire grinder to the power tool is the fixing of the rod to the chuck and thus the grinder is adapted for use in a power drill commonly found in most home owner's work shops.

Very briefly, the preferred embodiment of this invention includes a rod having one end adapted to fit the chuck of a power drill, a portion spaced from said end having grinding teeth and the intermediate portion being smooth. A guide fixture includes a plate having a center opening adapted to accommodate the grinding portion of the rod and guide surfaces on each side of the opening adapted to rest on the top plate and depth gauge of a saw chain cutting link. A U-shaped bracket like portion is formed adjacent the guide surfaces with guide openings provided in the legs of the U adapted to receive the smooth intermediate portion of the rod. Bushings in these guide openings permit rotation of the rod relative to the plate. The guide openings in the legs of the U are aligned relative to the guide surfaces so that the proper relationship is established between the grinding portion of the rod and the cutting edge of a saw chain cutting link.

Having described the invention briefly, a more complete understanding will be realized by reference to the following detailed description and drawings wherein.

Figure 1:
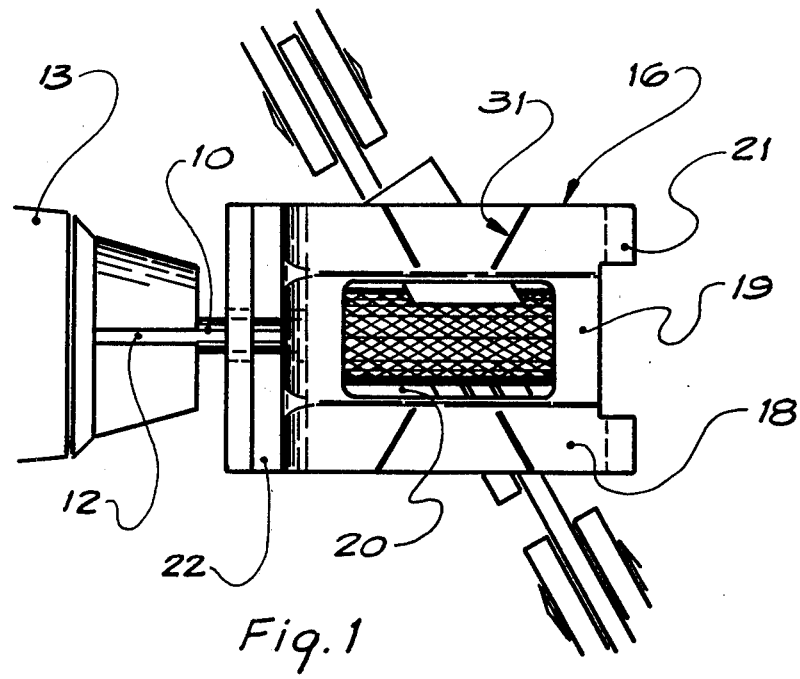
FIG. 1 is a top view of a saw chain grinder fixture in accordance with the present invention.
Figure 2:
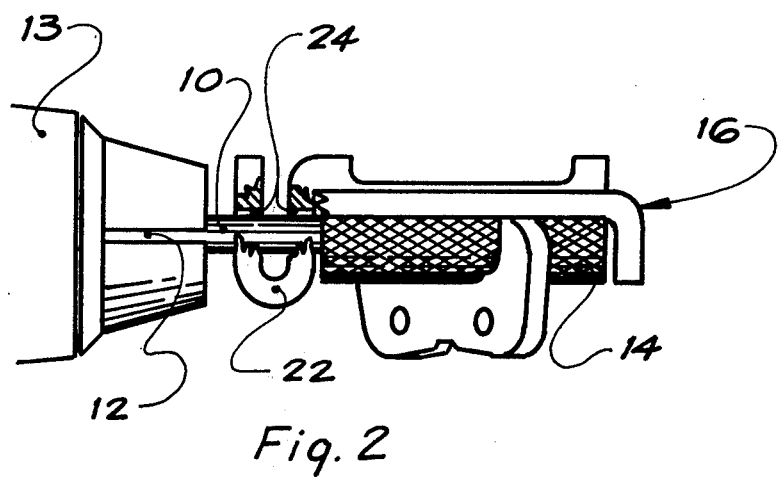
FIG. 2 is a side view of the saw chain grinder fixture of FIG. 1.

Referring to FIGS. 1 and 2, a rod 10 is adapted at one end 12 to be securely clamped in a power tool 13, e.g. a drill motor. Spaced from said one end and covering a substantial end portion of the rod 10 are grinding teeth 14. A guide fixture 16 is comprised of a reference portion 18 having a center opening 20, and a U-shaped guide portion 22 having aligned guide openings 24 in the legs of the U. As can be seen by reference to FIGS. 1 and 2, the portion of the rod 10 between the grinding teeth 14 and end 12 clamped in the drill motor 13 is inserted into the guide openings 24 (the end 12 of the rod 10 being small enough to pass through said guide openings for assembly purposes) to fix the position of the reference portion 18 relative to the grinding teeth 14.

Figure 3:
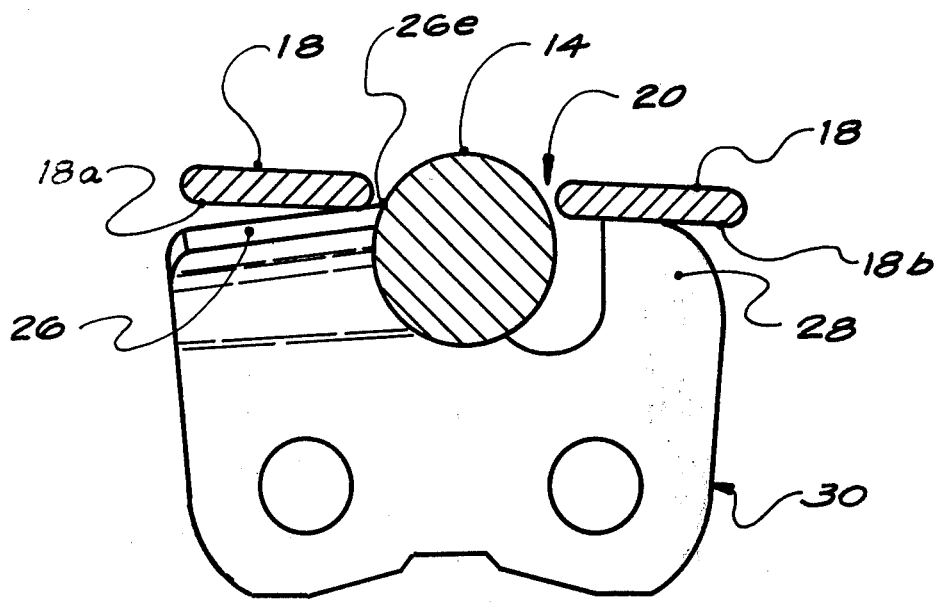
FIG. 3 is a schematic view illustrating the use of the grinder fixture of FIG. 1 and 2 in sharpening a cutting link of a saw chain.

Referring now more specifically to FIG. 3, in operation the underside of the reference portion 18 on each side of the opening 20 functions as guide surfaces 18a and 18b that rest respectively on the top plate 26 and depth gauge 28 of a cutting link 30. In this position the guide openings 24 guide the grinding teeth portion 14 of the rod 10 at the proper depth to grind the cutting edge 26e of the top plate 26. This cutting edge 26e is swept rearwardly at about a 35° angle and guide lines 31 are etched in the top of the flat plate portion (see FIG. 1) to properly align the rod with this cutting edge 26e. Also, as can be seen in FIG. 3, the grinding teeth 14 when properly located relative to the reference planes 18a and 18b projects into the opening 20 and intersects with planes 18a and 18b. To permit the grinding teeth to have an axial distance longer than opening 20, and also to permit assembly of the guide fixture 16 to the rod, the center section 19 of the reference portion at each end of the opening 20 is bowed so as to provide clearance for this intersecting portion of the grinding teeth. It will be understood that it is desirable to oscillate the rod relative the cutting edge to uniformly wear the grinding teeth. To provide a stop for the user during the oscillating movement, depending tabs 21 are formed at the end of the guide fixture.

Figure 5:
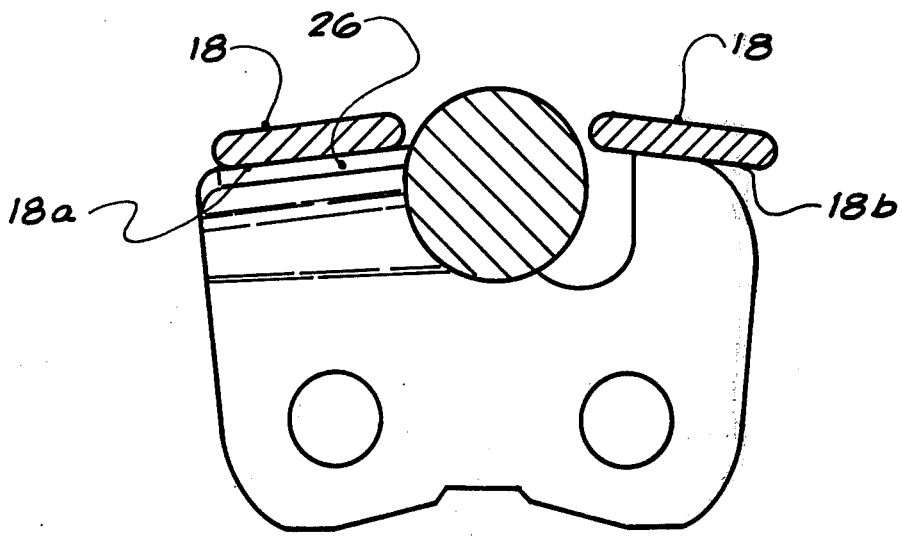
FIG. 5 is a view similar to FIG. 3 but illustrating a modification to the configuration of the guide fixture.

A variation of the reference portion 18 is illustrated in FIG. 5. Thus rather than the reference surfaces being co-planar they are angled relative to each other whereby guide surface 18a is angled to accommodate the relief angle provided in the top plate 26 and thus the guide surface has greater contact, i.e. surface contact rather than line or point contact, with the top plate. Likewise the guide surface 18b is angled in the opposite direction to accommodate the cammed leading edge of the depth gauge. This greater area of contact is believed to provide better support and improved accuracy in sharpening the cutting edge 26e.

Figure 4:
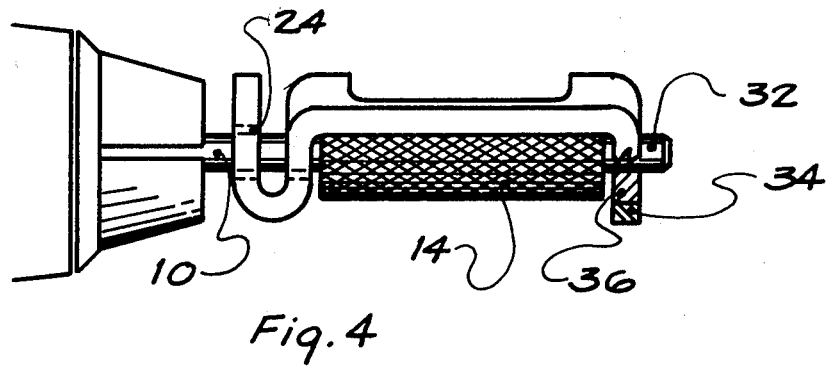
FIG. 4 is a side view similar to FIG. 2 but showing an alternate embodiment of the invention.

Other embodiments will of course become apparent to those skilled in the art without departing from the invention. For example, whereas the guide fixture can be made of a hard metal so that the guide openings 24 can withstand the rotating rod without rapid wearing, it is deemed preferable to make the guide fixture of a softer material and then line the guide openings with hard metal bushings or even rotatable bearings. Also to provide improved axial support for the rod 10, the rod is extended as illustrated in FIG. 4 to provide an outer end portion 32 beyond the grinding teeth 14. An outer bracket portion 34 of the guide fixture is formed with a further guide opening 36, aligned with guide openings 24. The end portion 32 of the rod is inserted through opening 36 to further support the rod in the desired relative position with respect to guide surfaces 18a and 18b. Whereas the grinding portion of the rod is illustrated as having a greater diameter than the rod portions inserted in the guide openings, the guide opening 36 is provided with a removable bushing which permits passage of the larger grinding teeth portion of the rod for assembly purposes. It will also be understood that with this outer support for the rod, one of the legs of the U-shaped portion can be eliminated. Still farther if desired the outer end can be shaped into a U to provide two guide openings 36 and thereby eliminate the entire inner U-shaped portion. It will be understood that the dual guide openings are suggested to provide a stable guide path for the rod but that a satisfactory guide path can be provided by a single elongated guide opening, e.g. in an elongated depending lug portion.

The above as well as other variations are considered to be within the concept of the invention as defined in the claims appended hereto.

What I claim is:

1. A saw chain grinder fixture comprising; a rod, one end of the rod adapted to be fixed to the chuck of a power tool for rotatively driving the rod, a grinding portion on the rod adapted when rotatively driven to grind the cutting edge of a cutting link of a saw chain; a guide fixture including a reference portion nd a depending guide portion having a guide opening, said reference portion having a central opening and guide surfaces on each side of the opening adapted to rest respectively on the top plate and depth gauge of the cutting link, and said rod inserted into said guide opening of said depending guide portion to position the rod axially along the guide fixture, and means fixing the axial position of the rod relative to the guide fixture to position the grinding portion of the rod in the opening of the guide fixture and relative to the guide surfaces for proper sharpening of the cutting edge as the rod is rotatively driven.

2. A saw chain grinder fixture as defined in claim 1 wherein the reference portion is angled to accommodate the relief angle of the top plate.

3. A saw chain grinder fixture as defined in claim 1 wherein the depending guide portion of the guide fixture is U-shaped with guide openings provided in each leg of the U and aligned so as to define an axial path for the rod to properly locate the rod relative to the guide surfaces.

4. A saw chain grinder fixture as defined in claim 1 wherein a bushing is provided in the guide opening to permit free rotative movement of the rod relative to the guide fixture.

5. A saw chain grinder fixture as defined in claim 1 wherein a portion of the rod on each side of the grinding teeth portion is smooth, said guide fixture having a depending guide portion on each end of the opening and a guide opening in each depending guide portion adapted to receive the smooth portions of the rod, sid guide openings aligned to axially position the grinding portion of the rod relative to the guide surfaces to properly sharpen the cutting edge of the cutting link.

6. A saw chain grinder fixture as defined in claim 5 wherein the grinding portion of the rod has a greater diameter than said smooth portions, and a removable bushing is provided in the guide opening of one of the depending guide portions for accommodating the insertion of the larger diameter of the grinding portion to permit assembly of the guide fixture to the rod.

7. A saw chain grinder fixture as defined in claim 1 wherein depending stop tabs are formed in the end of the guide fixture to limit the axial oscillating movement of the grinding fixture relative to the saw chain being sharpened.

* * * * *